United States Patent Office 2,713,549
Patented July 19, 1955

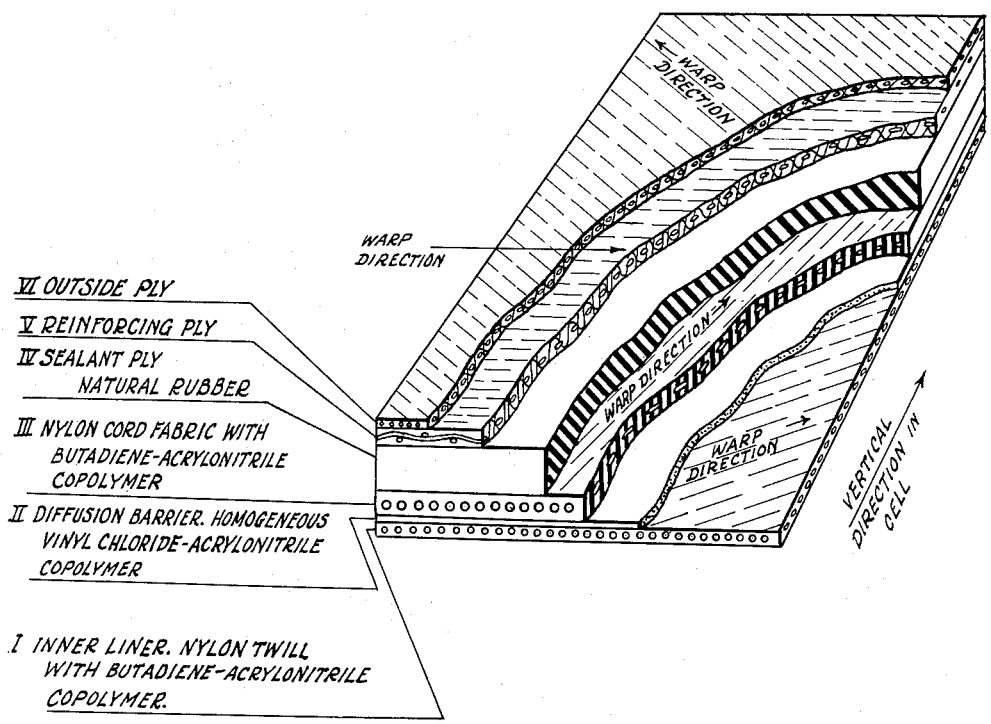

2,713,549

FUEL CELL DIFFUSION BARRIER

Robert J. Reid, Canal Fulton, and Chris E. Best, Franklin Township, Summit County, Ohio, assignors to The Firestone Tire & Rubber Company, Akron, Ohio, a corporation of Ohio Application April 20, 1950, Serial No. 157,061

2 Claims. (Cl. 154—43.5)

This invention relates to novel diffusion barrier membranes in non-metallic fuel cells such as are employed in aircraft and other vehicles.

The type of fuel cell to which the present invention relates consists of a plurality of laminae of elastomeric and/or plastic materials plied together to form a tank of the desired shape for containing hydrocarbon and other fuels and liquids. In such cells there is usually provided one lamina or "diffusion barrier" of a material which has an extremely high resistance to the diffusion of the cell contents therethrough. The requirements for the material to be used in such a fuel barrier are rather exacting. On the manufacturing side, the material should be soluble in a commercial, non-toxic volatile solvent so that it may be applied as a liquid coating to the cell at some stage during the manufacture thereof, and dried to form the diffusion barrier, as this is the most convenient method of forming a thin, continuous and seamless vapor barrier lamina. On the performance side, the material must be extremely impervious to the hydrocarbon and other fuels which may be contained in the fuel cell, while at the same time being wholly insensitive to humidity. The material must have good adhesion to the other adjacent laminae in the fuel cell, and must remain dimensionally stable, tough, flexible and strong over long periods of time, and over repeated cycles of extreme heat and extreme cold. In addition, in the case of fuel cells having sealant laminae therein for the purpose of closing gunfire wounds, the barrier must have favorable gunfire shattering characteristics—i. e., any shattering of the barrier must be confined to the immediate vicinity of the wound. These requirements have led, in practice, to the almost exclusive use of nylon resin for this purpose. Even nylon has certain deficiencies, notably the cold properties leave much to be desired, and the resins are permeable to ethanol which is coming into importance as a fuel and as a constituent of fuels. Likewise, it is difficult to obtain adhesion of nylon to the adjacent plies of the fuel cells in which it is employed. It is apparent, therefore, that there exists a considerable field for the introduction of novel diffusion barrier materials of improved properties.

Accordingly it is an object of this invention to provide a novel diffusion barrier for fuel cells.

Another object is to provide such a diffusion barrier having improved properties, particularly dimensional stability, strength and toughness at extremes of high and low temperatures and humidities.

A further object is to provide such a barrier which will have excellent gunfire characteristics.

A still further object is to provide novel barrier materials which are soluble in cheap commercial solvents of low toxicity, so that they may be applied to the fuel cells by a simple coating operation.

SYNOPSIS OF THE INVENTION

The above and other objects are secured, in accordance with this invention, in a fuel cell barrier composed essentially of a "homogeneous" copolymer of vinyl chloride with acrylonitrile containing from 30% to 80% vinyl chloride, balance acrylonitrile. As noted, these copolymers are "homogeneous" i. e., substantially all of the copolymer fractions have compositions within the range above cited; they do not consist simply of mixtures of copolymers having compositions lying partly or wholly outside the cited range but having an average composition lying within the cited range. The mode of preparation of these copolymers will be set forth more fully hereinbelow. These copolymers are soluble in solvents such as methyl ethyl ketone to form solutions which may be applied by brushing or spraying to the fuel cell during construction, and bond readily (either without any adhesive at all, or else by the use of a suitable graded adhesive blend containing a mixture of the copolymer and the material to which it is to be adhered). The barriers of this invention have excellent resistance to the diffusion of any of the hydrocarbon fuels, including aromatic fuels, ordinarily contained in non-metallic fuel cells, and have excellent strength, toughness, dimensional stability and gunfire characteristics at any temperatures or humidities likely to be encountered in service.

The invention is illustrated in the accompanying drawing, which is a perspective view of a portion of a wall of a fuel cell constructed in accordance with this invention, with the successive laminae stripped back to show the arrangement thereof.

THE HOMOGENEOUS VINYL CHLORIDE-ACRYLONITRILE COPOLYMERS

If vinyl chloride and acrylonitrile are copolymerized by a conventional procedure in which all of the vinyl chloride and acrylonitrile to be used are simply mixed together and subjected to polymerization conditions, the acrylonitrile polymerizes preferentially, so that the copolymer fraction initially formed is quite rich in acrylonitrile. In the measure that the acrylonitrile becomes exhausted from the polymerization mass, the copolymer fractions formed become progressively richer in vinyl chloride. The resulting total product may be said to be "inhomogeneous" in that it contains fractions of copolymer constituents having compositions deviating widely from the composition of the mixed product as a whole. These fractions may actually be separated from the products by fractional precipitation of the copolymer from a solution thereof by progressive addition of a non-solvent. The successive fractions so obtained will be found on analysis to have compositions individually differing widely from the average composition of the entire product from which they are derived.

By way of contrast, the copolymers for use in this invention are homogeneous, in that they do not contain any substantial amount (say not more than 5%) of any fractions having compositions outside the range 30% to 80% vinyl chloride, balance acrylonitrile. All of the above cited percentages are on the basis of the weight of the copolymer. The copolymers are prepared by emulsifying in water, in the presence of a free-radical-liberating catalyst, a mixture of vinyl chloride and acrylonitrile containing from 62% to 95% vinyl chloride, balance acrylonitrile. As the reaction proceeds, the acrylonitrile enters the polymerization reaction preferentially; to counterbalance this, increments of acrylonitrile are added from time to time in amounts such that the percentage of unpolymerized vinyl chloride based on the total weight of unpolymerized vinyl chloride and unpolymerized acrylonitrile in the reaction mass, remains within the range 62% to 95%, and preferably remains substantially constant at its initial value at the beginning of the reaction.

A convenient method of following the reaction analytically for the purpose of determining the amount of increments of acrylonitrile to be added, is based upon the assumption that during the intervals between increments, the copolymer composition does not depart widely from that of the copolymer formed at the very beginning of the reaction. This proportion is, of course, dependent upon the proportions of the monomeric vinyl chloride and acrylonitrile originally charged into the reaction mass, in accordance with the equation $$\frac{dM_1}{dM_2} = \frac{M_1}{M_2} \frac{M_1 r_1 + M_2}{M_2 r_2 + M_1}$$

under the notation of Lewis et al., J. A. C. S. 70:1519–23, wherein, as applied to the present instance:

$dM_1/dM_2$=the ratio of acrylonitrile to vinyl chloride in the polymer formed at the time under consideration, here the beginning of the reaction.

$M_1$=concentration of acrylonitrile in the charge at the time under consideration, here the beginning of the reaction.

$r_1$=3.3=reactivity ratio for acrylonitrile.

$M_2$=concentration of vinyl chloride in the charge at the time under consideration, here the beginning of the reaction.

$r_2$=0.02=reactivity ratio for vinyl chloride.

The above concentrations and ratios are figured on the basis of the molar quantities of acrylonitrile and vinyl chloride. From the amount, ascertained by determination of solids in the reaction mass at any given time, and assumed composition of the polymer formed, the respective amounts of acrylonitrile and of vinyl chloride that have been polymerized may be calculated. Subtraction from the amounts of acrylonitrile and vinyl chloride originally in the reaction mass or added subsequently gives the respective amounts of the still-unpolymerized acrylonitrile and vinyl chloride in the reaction, and sufficient acrylonitrile is then added to bring the ratio of unpolymerized acrylonitrile to unpolymerized vinyl chloride back to its original value. These increments, to give the best results, should be made fairly frequently, say after each 10 or 15% of monomers has polymerized.

The polymerization reaction may be carried out under widely variable emulsion polymerization conditions. The weight-ratio of monomers (acrylonitrile plus vinyl chloride) to aqueous emulsion medium may vary from 1:1 to 1:6. Any of the usual emulsifying agents may be employed, such as sodium fatty soaps on the order of sodium or potassium laurate, myristate, oleate, etc., or the sodium or potassium sulfates of lauryl, myristyl, oleyl, palmityl and stearyl alcohols. The polymerization may be carried out over a wide range of temperatures, conveniently from 15° C. to 105° C. Any of the usual free-radical-generating catalysts may be employed, such as sodium, potassium or ammonium persulfates and perborates, benzoyl peroxide, acetyl peroxide, d-t-butyl peroxide and the like.

APPLICATION AND PROPERTIES OF THE BARRIERS OF THIS INVENTION

The vinyl chloride-acrylonitrile copolymers employed in accordance with this invention are soluble in a number of commercial volatile solvents, examples of these being the ketones containing from 3 to 6 carbon atoms such as acetone, methyl ethyl ketone, methyl isopropyl ketone, cyclohexanone and the like. They are also soluble in acetonitrile, the nitroparaffins and the like. Solutions of the copolymers in these solvents may be used to coat the copolymers onto the appropriate lamina of the fuel cell during construction thereof. The vinyl chloride-acrylonitrile copolymers have a limited compatibility with the elastomeric butadiene-acrylonitrile copolymers which usually constitute the laminae in fuel cells adjacent the diffusion barriers; good bonding is therefore easily obtained in the practice of this invention. The nylon resins heretofore employed as barriers required the use of special adhesives to bond the nylon membrane to the adjacent laminae.

The vinyl chloride-acrylonitrile copolymers may be plasticized, if desired, by the addition of plasticizers of the usual types, such as di(2-ethyl hexyl) phthalate, trioctyl phosphate and the like. Preferably, there should be employed plasticizers which will not be extracted by aircraft fuels, and as a specific test, are not miscible with a mixture of equal parts of toluene and n-heptane. A particularly advantageous class of plasticizers comprises the alkyl phthalyl alkyl glycolates, such as methyl phthalyl ethyl glycolate, as these plasticizers are highly resistant to extraction by the various fuels which will be contained in the cells.

The barriers of this invention have extremely small permeability for any of the fuels ordinarily employed in aircraft, including paraffinic and aromatic fuels and fuels containing lower aliphatic alcohols such as ethanol. They retain their strength, flexibility and toughness at the extremes of high and low temperatures to which fuel cells will ordinarily be subjected. Particularly in fuel cells designed for military use, the diffusion barriers of this invention have the desirable property of not shattering over a wide area when penetrated by gunfire, which both improves the performance of the cell after such penetration and before repair, and also simplifies the repairing operation, since it is only necessary to repair the cell wall in the immediate vicinity of the wound.

With the foregoing general discussion in mind, there is given herewith a detailed example of the practice of this invention. All parts given are by weight.

A. *The homogeneous vinyl chloride acrylonitrile copolymer*

A specially prepared vinyl chloride-acrylonitrile copolymer was employed in the barrier layer of a fuel cell constructed as will be described hereinbelow. This resin contained by analysis 60% vinyl chloride and 40% acrylonitrile by weight and is a homogeneous copolymer, i. e., all of the polymer chains contain approximately 60% vinyl chloride, 40% acrylonitrile by weight. The resin was manufactured by an incremental technique such as described above, i. e., the vinyl chloride and acrylonitrile were charged into the polymerization reaction in such proportions that the initially formed copolymer contained the cited percentages of the monomers, and additional quantities of acrylonitrile were added from time to time during the reaction to keep the ratio of unpolymerized acrylonitrile to unpolymerized vinyl chloride in the reaction mass substantially at its original value.

A film having a thickness when dried of .002 inch was cast from an acetone solution of this resin. The film was quite flexible at −32° C. and retained a considerable degree of flexibility at −40° C. This film passed a 40% aromatic aviation fuel at the rate of only .007 fluid ounce per square foot per 24 hours at the end of 8 days on a diffusion test in which one side of the film was in contact with air, and the other side was in contact with the fuel. This test gives variable results, but the above figure is well below the Air Force maximum of .02 fluid ounce per square foot per 24 hours.

B. *Fabrication and testing of a fuel cell*

A fuel cell in the form of a cube having a dimension of two feet on each edge was constructed from the plies listed below. The cell was built up in the usual way upon a destructible plasterboard form having an external configuration mating with the internal configuration of the cell to be constructed. Successive laminae in the order as listed below were plied upon the form with suitable laps at the corners and seams. Most of the plies had a tacky character, so as to remain in place as built, which tack was usually enhanced, or provided when missing, by brushing the surface with a solvent and/or adhesive. Certain of the plies had embedded reinforcing cords, which are described below as running "vertically," "horizontally," etc. The vertical direction in the side walls of the cell was taken as the vertical direction of the wall as the cell was to be installed for use; the "vertical" direction of the top and bottom walls of the cells were directions arbitrarily selected parallel to one edge of the walls in question.

After the several plies had been built upon the form, the assembly was placed in an oven and subjected to heat to cure the vulcanizable elastomer plies. At the conclusion of the curing, the assembly was cooled and the plasterboard form broken up and removed through a hand hole left in one face of the cell.

Following is a description of the several plies, listed in the order in which they were plied up, i. e., the order in which they are found in the completed cell, going from the interior (fuel) side thereof to the outside.

I. *Inner liner.*—A .006 inch thick nylon twill fabric (a) impregnated with a conventional adhesive dip, and having (b) a spread coat of an elastomeric butadiene-acrylonitrile copolymer on each side and (c) an elastomer-butadiene-acrylonitrile skim coat on each side on top of the spread coat. Total thickness of the ply, .021 inch. The butadiene-acrylonitrile copolymer was compounded with conventional vulcanizing agents. In the cell construction, the fabric was disposed with its warp at 45° from the vertical from left at the bottom to right at the top of the respective faces to which it was applied.

II. *Diffusion barrier.*—Applied by brush-coating of a solution of the following ingredients.

|  | Parts |
|---|---|
| Homogeneous vinyl chloride-acrylonitrile copolymer (containing 60% vinyl chloride, and 40% acrylonitrile by weight; prepared by incremental technique as described above so that all fractions thereof have compositions substantially the same as the whole unfractionated copolymer. Not more than 2% by weight of the fractions had compositions outside the range 30–80% vinyl chloride, balance acrylonitrile. Fractionation was by addition of methanol to a methyl ethyl ketone solution of the copolymer) | 75 |
| Methyl phthalyl ethyl glycolate | 25 |
| Methyl ethyl ketone | 900 |

This diffusion barrier solution was brush-coated over the entire surface of ply I after it had been built upon the form. Three coats were applied in all, with drying at 60° C. for 3 hours after each coat.

III. *A weak-wefted nylon cord fabric impregnated with a suitable adhesive dip.*—On the side nearer the fuel, the fabric carried one spread coat and one skim coat of a butadiene-acrylonitrile copolymer composition. On the side further from the fuel, the fabric carried a spread coat and a skim coat of a butadiene-styrene elastomer stock. The elastomer stocks were compounded with conventional vulcanizing agents, and the cord was disposed in the direction assumed to be vertical for the respective cell faces. Total thickness of ply, .044 inch.

IV. *Sealant ply.*—A single, unreinforced calendered sheet of natural rubber base, .110 inch thick, containing no reinforcing fabric. Contains reduced amounts of vulcanizing agents, so as to be only lightly cured.

V. *Reinforcing ply.*—A weak-wefted nylon cord fabric impregnated with a conventional adhesive dip, and having a spread coat and a skim coat of a butadiene-styrene elastomer compound on each side thereof. Vulcanizing agents were included for full vulcanization. The cords were disposed in the direction assumed to be horizontal for the respective faces.

VI. *Reinforcing and outside ply.*—A .006 inch thick nylon twill fabric impregnated with a conventional adhesive dip and having a spread coat and a skim coat of a butadiene-styrene elastomeric copolymer on the side nearer the fuel and a spread coat and a skim coat of a butadiene-acrylonitrile elastomeric copolymer on the side farther from the fuel. The warp in this ply was disposed at right angles to the warp in ply I.

The cell constructed as above described was tared, then filled three-quarters full of an aromatic aviation fuel. The cell was then mounted in a rocking machine which rocked the cell through an angle of 30° (15° on each side of the vertical) at a rate of 18 cycles per minute. The fuel was kept at 100–120° F., the rocking was continued for 25 hours. The fuel was removed, the interior of the cell blown out superficially dry, and the cell was reweighed. No measurable increase in weight was observed.

GUNFIRE TEST

The cell was mounted in a supporting enclosure of a construction corresponding to the supporting enclosures provided for fuel cells in aircraft, said enclosure comprising walls of one-eighth inch aircraft aluminum sheet having riveted on the interior thereof three-quarter inch hat sections of .064 inch thick aircraft aluminum sheet on four-inch centers so as to space the fuel cell from the walls. A resin impregnated three-ply fabric laminate with a weight of 0.41 pound per square foot was interposed between the hat-sections and the fuel cell. The cell was filled three-quarters full of aromatic aviation fuel for the test.

The cell was then shot tested by firing four rounds of 50 caliber armor-piercing ammunition therethrough at a range of 25 yards, the temperature being −20° F. and a tumble-board being interposed in the line of fire to provide full tumble of the projectile at its point of entry into the cell. Two rounds were fired into one face of the cell in a direction normal thereto, and thereafter another two rounds were fired into an adjacent face in a direction normal to that face. Tabulated herewith are the particulars of the test.

| Round No. | Fuel head at wound (inches) | Condition of Wound After | |
|---|---|---|---|
| | | 1 minute | 2 minutes |
| No. 1—entry | 5 | seep | seep. |
| No. 1—exit | 5½ | dry | dry. |
| No. 2—entry | 9 | fast seep | seep. |
| No. 2—exit | 9 | dry | dry. |
| No. 3—entry | 3 | leak | leak. |
| No. 3—exit | 3 | dry | dry. |
| No. 4—entry | 7¼ | leak | dry. |
| No. 4—exit | 7½ | dry | dry. |

At the conclusion of the shot test, the fuel was removed, and the walls of the cell cut and peeled back in the areas surrounding the wounds to expose the diffusion barrier. In no case was the barrier shattered beyond two inches from the wound. Moreover, the shattering was in a desirable pattern of concentric rings of cracks surrounding the wound, rather than radially extending cracks which might tend to propagate further away from the wound.

Fuel cells built as described above and installed in military aircraft gave satisfactory service over extended periods of time.

From the foregoing general discussion and detailed specific examples, it will be evident that this invention provides novel diffusion barriers for fuel cells, which barriers have excellent resistance to the diffusion of a wide variety of liquid fuels. The barriers have excellent gunfire characteristics, in that they shatter over only relatively small areas in the vicinity of gunfire wounds. The barrier materials are soluble in various commercial solvents for convenient application during fabrication of the fuel cells, and have excellent adhesion to adjacent plies of such cells.

What is claimed is:

1. A non-metallic fuel cell comprising an innermost lamina of a butadiene-acrylonitrile elastomeric copolymer composition, in contact with the fuel therein, a sealant lamina of an elastomeric composition swellable by the fuel and disposed exteriorly of said innermost lamina, and a diffusion barrier membrane interposed between said innermost lamina and said sealant lamina and comprising a copolymer of vinyl chloride and acrylonitrile containing from 30% to 80% by weight of vinyl chloride, the balance being acrylonitrile, said copolymer being homogeneous in that a maximum of 5% of the fractions thereof have compositions outside the range of from 30% to 80% by weight of vinyl chloride, the balance being acrylonitrile.

2. A non-metallic fuel cell comprising an innermost lamina of a butadiene-acrylonitrile elastomeric copolymer composition, in contact with the fuel therein, a sealant lamina of an elastomeric composition swellable by the fuel and disposed exteriorly of said innermost lamina, and a diffusion barrier membrane interposed between said innermost lamina and said sealant lamina, said membrane comprising (A) a copolymer of vinyl chloride and acrylonitrile containing from 30% to 80% by weight of vinyl chloride, the balance being acrylonitrile, said copolymer being homogeneous in that a maximum of 5% of the fractions thereof have compositions outside the range of from 30% to 80% by weight of vinyl chloride, the balance being acrylonitrile, together with (B) from 15 to 50% of methyl phthalyl ethyl glycolate, based on the total weight of said copolymer and said methyl phthalyl ethyl glycolate.

References Cited in the file of this patent

UNITED STATES PATENTS

| | | |
|---|---|---|
| 2,420,330 | Shriver et al. | May 13, 1947 |
| 2,439,366 | McLaughlin | Apr. 6, 1948 |
| 2,457,873 | D'Alelio | Jan. 4, 1949 |
| 2,497,123 | Frolich | Feb. 14, 1950 |

OTHER REFERENCES

"Behavior of Plasticizers in Vinyl Chloride-Acetate Resins," by M. C. Reed; published in Industrial and Engineering Chemistry, vol. 35, August 1943, page 899, TP978, R34.